Figure 1:
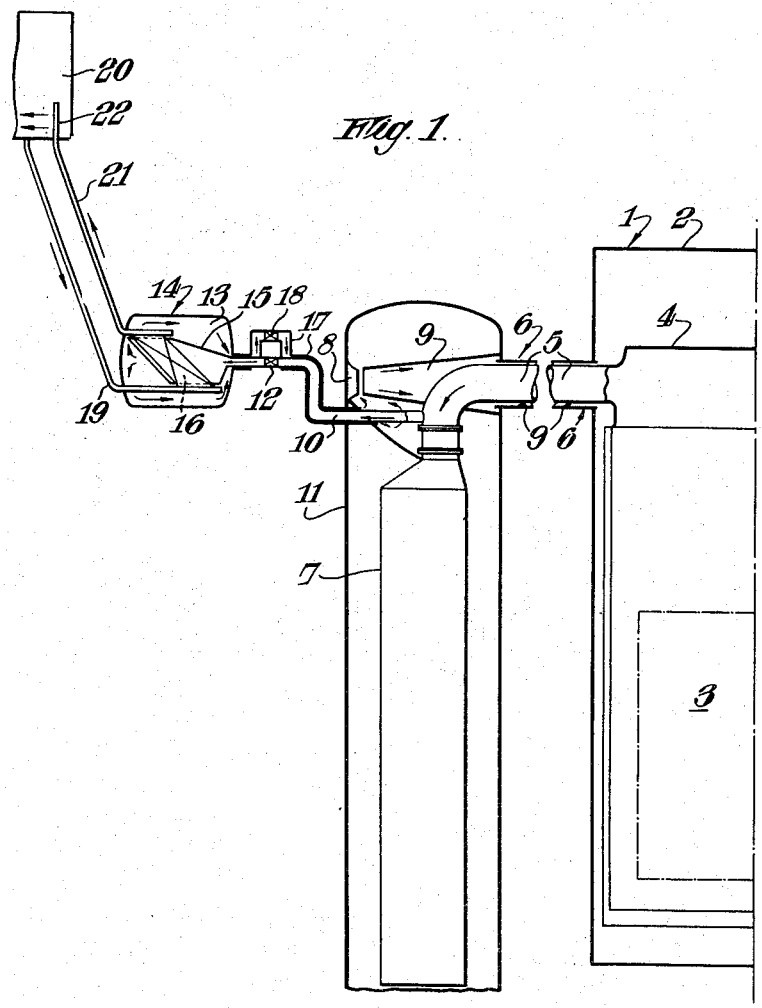

INVENTOR
JOHN ALAN DODD

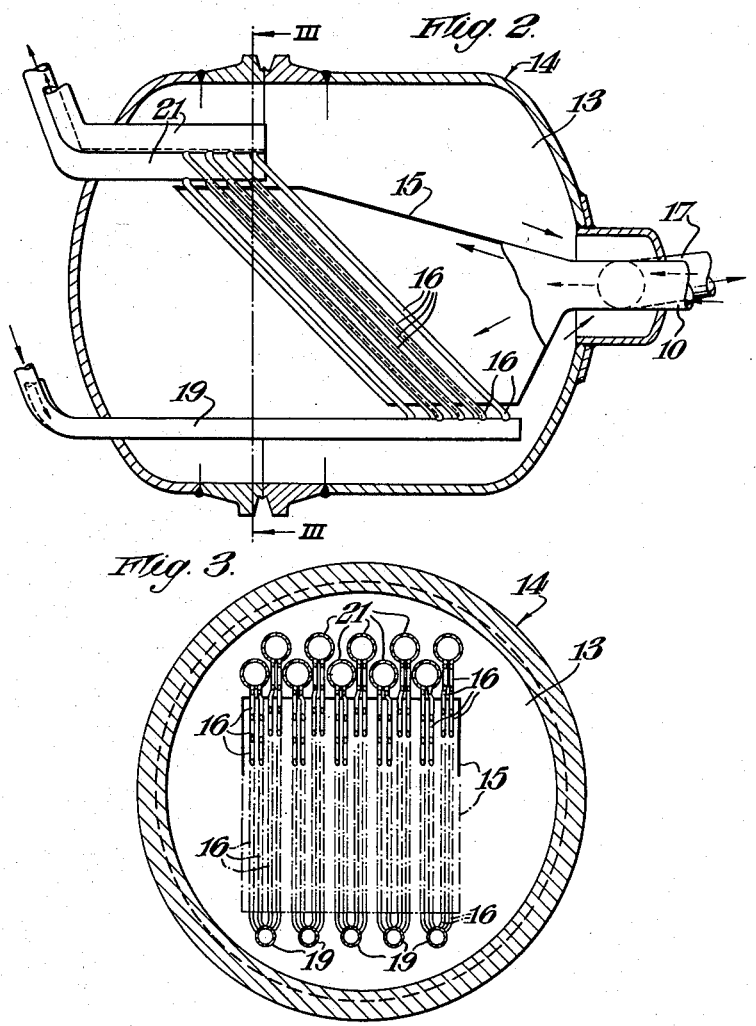

United States Patent Office 3,127,322
Patented Mar. 31, 1964

3,127,322
NUCLEAR REACTORS
John Alan Dodd, Wallasey, England, assignor to United Kingdom Atomic Energy Authority, London, England
Filed Dec. 8, 1959, Ser. No. 858,215
Claims priority, application Great Britain Dec. 15, 1958
1 Claim. (Cl. 176—38)

This invention relates to nuclear reactor heat exchanger constructions and in particular to means for removing fission product heating arising from the fuel elements in the core structure of a shut-down gas cooled nuclear reactor on cessation of forced coolant circulation between reactor and heat exchanger.

One possible means of removing fission product heating as aforesaid is to position the heat exchanger or heat exchangers substantially above the reactor core so as to provide a head sufficient for establishment of a natural convection flow of coolant on circulator failure. However, considerations of design may cause this expedient to be impractical to adopt. For example, considerations of height and weight would prevent its being adopted in the case of a marine-borne reactor. Furthermore, this expedient would be rendered valueless should the ship containing the reactor heel over, unless the heat exchangers were disposed well outboard of the reactor core so as to provide sufficient head for natural convection to occur on any degree of list up to 90°. Sufficient outboard disposition of the heat exchangers would, however, be impractical due to their massive nature, and the additional gas paths involved would result in uneconomic heat losses. From these and other considerations, it is apparent that a means of removing fission product heating is desirably divorced from utilising coolant flow through the main heat exchangers.

According to the invention, apparatus for removing fission product heating from the fuel elements in the core structure of a gas cooled nuclear reactor on cessation of forced coolant circulation in a closed circuit between the core structure and a main heat exchanger comprises a secondary heat exchanger valved ducting connecting said secondary heat exchanger in a closed circuit with said core structure, said secondary heat exchanger being disposed above the core structure for establishing by thermosyphoning a flow of reactor coolant between the reactor core structure and the secondary heat exchanger on cessation of normal coolant circulation, a header tank at a level above said secondary heat exchanger for supplying heat exchange fluid to said secondary heat exchanger, said heat exchange fluid being returned to the header tank by thermosyphoning from the secondary heat exchanger after being heated therein by coolant from the reactor core structure, thereby removing heat from the reactor coolant derived from fission product heating in the reactor core structure.

The header tank may be closed to the atmosphere, and may have means whereby the fluid which it contains is itself cooled, for example by water jacketing or by incorporation of a further heat exchanger therein.

There may be a plurality of secondary heat exchangers and associated header tanks spaced around the reactor, each of the secondary heat exchangers being offset radially from the longitudinal axis of the reactor core structure and each header tank being offset radially from its associated secondary heat exchanger with respect to the longitudinal axis of the reactor core structure so that each of the secondary heat exchangers and its associated header tank lie substantially in a plane which is radial to the longitudinal axis of the reactor core structure whereby, should the reactor core become bodily tilted from the vertical to any inclination between the vertical and the horizontal, at least one secondary heat exchanger will still be disposed above the reactor core and its associated header tank will still be above the respective secondary heat exchanger.

The reactor coolant is preferably kept out of direct contact in the secondary heat exchanger(s) with the fluid supplied thereto by the header tank(s) by forming the or each heat exchanger as a chamber having an entry and outlet for reactor coolant and containing a bank of pressure tubes adapted to have the fluid from the associated header tank passed through them.

Because the heat which has to be removed from the fuel elements due to fission product heating or cessation of normal coolant circulation is much less than the heat which has to be removed during normal operation of the reactor, the secondary heat exchangers can be made much smaller than the main heat exchangers. Because of this the secondary heat exchanger can be placed well outboard of the reactor core structure in the manner of the invention without giving rise to the problems associated with height and weight which would arise if the massive main heat exchangers were so disposed. Therefore the main heat exchanger can be located close to the reactor core structure which gives a short path for coolant to travel between the core structure and the heat exchangers thereby lessening heat losses of the coolant. Also where the reactor is installed as the motive power of a ship the compact arrangement of main heat exchangers and reactor core structure ensures that the massive components of the reactor can be located as near as possible to the centre of gravity of the ship which is advantageous for reasons of stability.

A constructional example embodying the invention will now be described with reference to the accompanying more or less diagrammatic drawings, wherein—

FIGURE 1 is a side half-view in medial section of a nuclear reactor incorporating apparatus according to the invention, FIGURE 2 is an enlarged fragmentary side view in medial section and illustrates a detail, and FIGURE 3 is an end view in section on line III—III of FIGURE 2.

Referring to the drawings, in the construction shown therein, FIGURE 1 illustrates half of a gas-cooled nuclear reactor generally indicated by the reference numeral 1 and having a pressure vessel 2 containing a core 3 in which are supported fuel elements (not shown) which transfer heat to pressurised gaseous coolant collected in a hot header 4 communicating via the inner duct 5 of coaxial ducting 6 with a re-entrant main heat exchanger 7, coolant being normally circulated by a blower 8 and being caused to flow via the outer duct 9 of the coaxial ducting 6 back to the pressure vessel 2 where it passes downwardly in contact with the walls of the pressure vessel and thence upwardly through the core 3 to the hot header 4, and so on. The duct 5 has a branch duct 10 passing outwardly through the pressure shell 11 of the main heat exchanger 7 via a valve 12 to the chamber 13 of a secondary heat exchanger generally indicated by the reference numeral 14 and more particularly shown in FIGURES 2 and 3. The duct 10 has a divergent portion 15 contained within the chamber 13 and serving to constrain coolant flowing in the duct 10 to flow over a bank of pressure tubes 16 supported (see FIGURES 1 and 2) at an inclination, conveniently 45°, to the vertical so as to extend outwardly and upwardly within the chamber 13. There is a gas return duct 17 from the chamber 13 having a valve 18 and extending back to the shell 11 of the heat exchanger 7 (for example, coaxially with the duct 10 as shown in FIGURE 1) which it enters and terminates in a position such that its open end is subject to blower suction during rundown thereof whilst being in communication with the outer duct 9. It will be appreciated that when the valves 12 and 18 are open, coolant from the reactor core can by-pass the main heat exchanger 7 and pass to and from the secondary heat exchanger 14. Returning to the latter, the pressure tubes 16 are connected at their lower ends to a plurality of feed pipes 19 which leave the chamber 13 and extend upwardly to a closed header tank 20. The upper ends of the pressure tubes 16 are connected to return pipes 21 which leave the chamber 13 and extend upwardly to the header tank 20, having their ends 22 disposed somewhat above the bottom thereof. The secondary heat exchanger 14 is disposed above and outwardly relative to the core 3, and the header tank 20 is disposed above and outwardly relative to the secondary heat exchanger 14 substantially in a radial plane containing the axis of the core 3 (i.e., the plane of the paper in FIGURE 1). The header tank 20 normally contains distilled water and may if desired, be provided with cooling means (not shown) which could take the form of a water jacket, a continuous water spray over its walls, or further heat exchanger means associated with the tank 20, for example cross tubes extending through the walls of the header tank and supplied with forced or natural feed cooling water.

In a modification (not shown), the duct 10 may branch from the duct 5 at any position between the pressure vessel 2 and the shell 11 of the heat exchanger 7, or alternatively where valving is provided in the duct 5, may extend directly from the hot header 4 separately from the duct 5.

Under normal operating conditions, the valves 12 and 18 are closed and reactor coolant is circulated normally between the core 3 and main heat exchanger 7. If failure of the blower 8 occurs without breach of the coolant circuit, the reactor is immediately shut down and the valves 12 and 18 are opened. This enables coolant to flow in the ducts 10 and 17 and over the pressure tubes 16. The coolant will have been heated by residual heat and fission product heating in the fuel elements and, due to the head between the core 3 and secondary heat exchanger 14 will flow by natural convection to the chamber 13. Water in the pressure tubes 16 will extract heat from the coolant which will return cool to the core 3 for reheating there and repassing to the chamber 13, and so on. Water in the tubes 16 will become heated and will rise up the pipes 21 to the header tank 20, being replaced by cooler water flowing from the tank 20 via the pipes 19. Eventually the water in the pipes 16 may boil and steam will be returned to the header tank 20 for condensing there. Whether any supplementary cooling (as aforesaid) of the header tank or water therein is needed depends on the amount of fission product heating to be accounted for; there should remain a reasonable quantity of water in the header tank so that any steam produced in the tubes 16 is condensed on returning to the tank 20.

The apparatus illustrated in FIGURE 1 as on the left of the reactor 1 may be duplicated on the right thereof (in the sense of the view shown in FIGURE 1). It will be appreciated that in this case, if due to an untoward occurrance the reactor and associated main heat exchanger(s) become tilted (in the plane of the paper in FIGURE 1) from the vertical into some position lying between vertical and horizontal, one apparatus for removing fission product heating would still remain effective, because, due to the offsetting of the secondary heat exchanger 14 and further offsetting of the tank 20, the heads necessary for the functioning of the apparatus would still remain. Furthermore, the inclination of the tubes 16 provides that these will always have an upward component to allow any steam formed to pass out of them. This principle can be extended to cover tilting in any direction up to horizontal by providing opposed apparatus in each of two planes containing the core axis and mutually at right angles, i.e., providing four apparatus of the kind illustrated in FIGURE 1.

It will be further appreciated that the apparatus described and shown in FIGURES 1-3 has particular application to a marine-borne reactor installation. In an embodiment particularly suited to such use, the reactor 1 would be centrally disposed in the ship and the secondary heat exchangers and header tanks would be disposed successively outboard and the tubes 16 inclining upwardly and outboard, with the header tanks conveniently disposed on the deck of the ship adjacent the ship's sides. Provision would thus be made for an untoward event which involved the ship's heeling over in either direction up to 90° from the vertical, for example, on sinking or on running aground. Provision may also be made to cover the unlikely case in which the ship sank nose or stern first and remained in that positiion, by providing a further pair of opposed secondary heat exchangers and header tanks disposed in a plane at right angles to the plane containing the first pair, as aforesaid. Purely transient changes of the core axis from the vertical, for example rolling and/or pitching in rough weather, are of course readily taken care of by the main heat exchangers provided that the circulators are functioning correctly.

I claim:

In a nuclear reactor system comprising a reactor core, a main heat exchanger disposed alongside the core and of a capacity to accept the full load heat generation of the core, coolant connections connecting the core in closed circuit with the main heat exchanger and a coolant blower for circulating gas coolant through said closed circuit; an auxiliary heat exchanger of a capacity to accept the shut-down heat generation of the core disposed above and outwardly of both the core and the main heat exchanger, branched ducts connecting the auxiliary heat exchanger with the closed circuit at points upstream and downstream of the core, valve means in said branch ducts for controlling gas flow between the auxiliary heat exchanger and the core, a water storage tank disposed above and outwardly of the auxiliary heat exchanger, and pipe connections between said tank and auxiliary heat exchanger for the thermosyphon circulation of water in heat exchange with gas in the auxiliary heat exchanger.

References Cited in the file of this patent

UNITED STATES PATENTS

| | | |
|---|---|---|
| 2,809,931 | Daniels | Oct. 15, 1957 |
| 2,810,689 | Wigner et al. | Oct. 22, 1957 |
| 2,961,393 | Monson | Nov. 22, 1960 |
| 2,977,297 | Evans et al. | Mar. 28, 1961 |